(12) United States Patent
Lang et al.

(10) Patent No.: US 11,238,052 B2
(45) Date of Patent: Feb. 1, 2022

(54) REFINING A SEARCH REQUEST TO A CONTENT PROVIDER

(71) Applicant: International Business Machines Corporation, Armonk, NY (US)

(72) Inventors: Alexander Lang, Stuttgart (DE); Reinhold Geiselhart, Rottenburg-Ergenzingen (DE)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 16/896,163

(22) Filed: Jun. 8, 2020

(65) Prior Publication Data

US 2021/0382904 A1 Dec. 9, 2021

(51) Int. Cl.
*G06F 16/2457* (2019.01)
*G06F 16/242* (2019.01)
*G06F 16/28* (2019.01)

(52) U.S. Cl.
CPC .... *G06F 16/24578* (2019.01); *G06F 16/2425* (2019.01); *G06F 16/285* (2019.01)

(58) Field of Classification Search
CPC ........... G06F 16/24578; G06F 16/2425; G06F 16/3325; G06N 20/00
See application file for complete search history.

(56) References Cited

U.S. PATENT DOCUMENTS

| 9,020,933 | B2 | 4/2015 | Oldham |
|---|---|---|---|
| 2016/0125087 | A1 | 5/2016 | Mallah |
| 2016/0140237 | A1 | 5/2016 | Musgrove |
| 2017/0351763 | A1 | 12/2017 | Ekambaram |
| 2019/0347304 | A1 | 11/2019 | Mallah |

FOREIGN PATENT DOCUMENTS

| CN | 101385025 B | 11/2013 |
|---|---|---|
| CN | 106294662 A | 1/2017 |

OTHER PUBLICATIONS

"Topic model", Wikipedia, last edited on Apr. 13, 2020, 6 pages, <ttps://en.wikipedia.org/wiki/Topic_model>.
"Patent Cooperation Treaty PCT International Search Report", International application No. PCT/IB2021/054324, International filing date May 19, 2021, Priority Date Jun. 8, 2020, 7 pages.

*Primary Examiner* — Hau H Hoang
(74) *Attorney, Agent, or Firm* — Edward Li

(57) ABSTRACT

A computer-implemented method, a computer program product, and a computer system for refining an initial search request to a content provider. The computer-implemented method includes receiving the initial search request from a user, submitting the initial search request to the content provider, receiving from the content provider a set of sample documents and source identifiers for respective ones of the sample documents, applying a topic model to the set of the sample documents to obtain a topic representation, presenting the topic representation to the user, receiving from the user topic relevance scores for respective ones of the topics, and classifying the data sources according to the topic relevance scores to obtain source relevance scores for respective ones of the data sources. The computer-implemented method further includes, based on the source relevance scores, determining a refined search request having an increased selectivity on documents covering a highest-scoring one of the topics.

20 Claims, 5 Drawing Sheets

Suggestions for Visa

◯ Refresh

🔍 Search obtain saudi apply arabia visa tourist apply entry stay passport embassy visit application visas applying days travel love countries american arrival canada mastercard requirements — 202 card credit cards bank debit cash account mastercard pay amex gift prepaid points rewards back bonus purchases payment earn money — 204 tickets follow qatar hotel discounts air visited cheap time blog 500 details 2019 found information dubai paris online canada registration — 206 vic weeroona project reviews vision strategic statement medicines generic buy active extra patients medical order cheap discount delivery line — 208 jonn journalist fake swamped thailand papers friends job mind months life real basically idea parents article cheap events — 210

REFINING A SEARCH REQUEST TO A CONTENT PROVIDER

BACKGROUND

The present invention relates to computer-based searching of textual information, and more particularly, to automatically generating a suggestion for a refined search request based on an initial search request.

Online media analysis tools fetch documents for particular data sources from content providers such as Twitter, Facebook, or SocialGist. Content provider APIs usually support at least two access mechanisms that can often be combined: Keyword-based retrieval, where the user specifies a set of keywords, optionally combined with AND, OR, or NOT, whereupon the data provider returns documents such as websites, text documents, forum posts, blog entries, etc. that contain this content; and site-based retrieval, where the user specifies a list of data sources such as websites, website sections, channels, feeds etc. and the content provider returns documents specifically from these sources.

In response to entering a search request, the user is usually presented a sample of documents. Before running a full analysis, the user may continue to search for a more relevant set of documents that supports the objective of analysis better. Especially, when searching for user-generated content, as it can be found abundantly in social-media data sources, keyword searches may likely result in ambiguous search results. For example, a search for "F-50" may return content about specific models of a sports car, a soccer shoe, a turboprop airliner and a coffee machine. For this purpose, the user may refine the query by adding keywords and/or sites.

SUMMARY

In one aspect, a computer-implemented method for refining an initial search request to a content provider is disclosed. The computer-implemented method includes receiving the initial search request from a user and submitting the initial search request to the content provider. The computer-implemented method further includes receiving from the content provider a set of sample documents and source identifiers for respective ones of the sample documents, where the source identifiers identify respective ones of data sources associated with the respective ones of the sample documents. The computer-implemented method further includes applying a topic model to the set of the sample documents to obtain a topic representation, where the topic representation is descriptive of topics covered by the respective ones of the sample documents. The computer-implemented method further includes presenting the topic representation to the user and receiving from the user topic relevance scores for respective ones of the topics. The computer-implemented method further includes classifying the data sources according to the topic relevance scores, to obtain source relevance scores for respective ones of the data sources. The computer-implemented method further includes, based on the source relevance scores, determining a refined search request, the refined search request having an increased selectivity on documents covering a highest-scoring one of the topics.

In another aspect, a computer program product for refining an initial search request to a content provider is disclosed. The computer program product comprises a computer readable storage medium having program instructions embodied therewith, and the program instructions are executable by one or more processors. The program instructions are executable to receive the initial search request from a user. The program instructions are further executable to submit the initial search request to the content provider. The program instructions are further executable to receive from the content provider a set of sample documents and source identifiers for respective ones of the sample documents, where the source identifiers identify respective ones of data sources associated with the respective ones of the sample documents. The program instructions are further executable to apply a topic model to the set of the sample documents, to obtain a topic representation, where the topic representation is descriptive of topics covered by the respective ones of the sample documents. The program instructions are further executable to present the topic representation to the user. The program instructions are further executable to receive from the user topic relevance scores for respective ones of the topics. The program instructions are further executable to classify the data sources according to the topic relevance scores, to obtain source relevance scores for respective ones of the data sources. The program instructions are further executable to, based on the source relevance scores, determine a refined search request, the refined search request having an increased selectivity on documents covering a highest-scoring one of the topics.

In yet another aspect, a computer system for refining an initial search request to a content provider is disclosed. The computer system comprises one or more processors, one or more computer readable tangible storage devices, and program instructions stored on at least one of the one or more computer readable tangible storage devices for execution by at least one of the one or more processors. The program instructions are executable to: receive the initial search request from a user; submit the initial search request to the content provider; receive from the content provider a set of sample documents and source identifiers for respective ones of the sample documents, the source identifiers identifying respective ones of data sources associated with the respective ones of the sample documents; apply a topic model to the set of the sample documents, to obtain a topic representation, the topic representation being descriptive of topics covered by the respective ones of the sample documents; present the topic representation to the user; receive from the user topic relevance scores for respective ones of the topics; classify the data sources according to the topic relevance scores, to obtain source relevance scores for respective ones of the data sources; and based on the source relevance scores, determine a refined search request, the refined search request having an increased selectivity on documents covering a highest-scoring one of the topics.

BRIEF DESCRIPTION OF THE SEVERAL VIEWS OF THE DRAWINGS

FIG. 2 depicts an exemplary topic representation, in accordance with one embodiment of the present invention.

DETAILED DESCRIPTION

Figure 1:
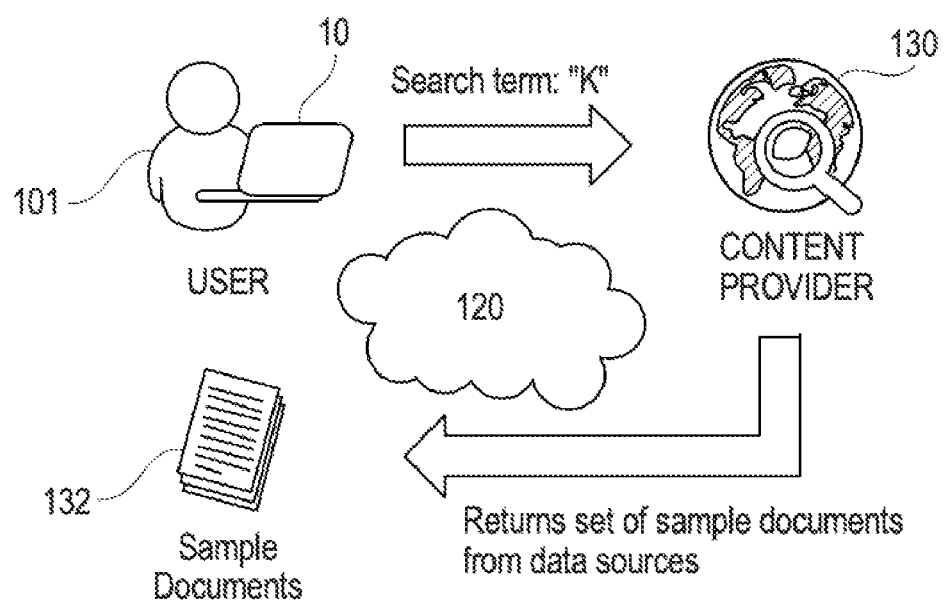
FIG. 1 depicts an exemplary computing environment adapted for retrieving sample documents in response to a search request, in accordance with one embodiment of the present invention.

Due to the ambiguous nature of text-based search queries, a user typically takes multiple iterations for refining the search query far enough to ensure that all relevant content is fetched, but no money is spent on fetching irrelevant content (content provider APIs typically deploy a pay-per-volume model). This may include conceiving a logical term that includes relevant keywords and data sources, excludes irrelevant keywords and data sources, and/or takes alternative keywords and/or data sources into account. Doing this in a productive way may require expert knowledge. Therefore, a simplified approach to iterative search querying is desirable.

The method for refining an initial search request to a content provider comprises the typical steps of: receiving the initial search request from a user, submitting the initial search request to the content provider. The initial search request may be received from the user on a direct way (e.g., using an input device) or indirectly (e.g., forwarded to the computing device implementing the method from a computing device via a network). The content provider may, not necessarily, be identical to one of the data sources.

In response to the submission, the computing device receives a set of sample documents from the content provider. The set of sample documents comes with a source identifier (e.g., a URL) that assigns each sample document to a data source from which the sample document originates. Within the scope of the present disclosure, a document shall be understood as any computer-readable data object carrying human-readable information to be incorporated by an output device. Without limitation, such human-readable information may be a text, an image, a sound, a video, or a combination thereof.

A data source, which, for simplicity, may also be referred to as "source" herein, may be any computing device that is connected to a network and that can be accessed by calling and routing, using the respective network, the source identifier. However, a data source may also be any computing device that can be accessed without a network, e.g., using a local interface of the respective computing device, where the local interface, any other component of the respective computing device, or a variable stored by the respective computing device, is identified by the source identifier. Moreover, a data source may be an entity that is not a computing device, including, but not limited to, an analog information storage, wherein the source identifier may specify, e.g., a non-digital or non-electronic source such as a book from where documents that can be processed by the computing device implementing the method have been obtained by digitization, a digitizing device such as a scanner that was used to reproduce the information contained in the non-digital or non-electronic source in such document, and/or a place such as an archive or a library where the respective non-computing source can be found.

Without limitation, data sources and documents that can respectively be retrieved from them may include forums, where a document may be a specific forum, a sub-forum within a larger forum site, or a single page or a portion of multiple pages from the respective forum or sub-forum; weblogs or blogs, where a document may be a particular blog, blog section, or a single page or a portion of multiple pages from the respective blog or blog section; microblog services, where a document may be a specific microblog pertaining to a particular user account or a page comprising an excerpt thereof; audio or video download or streaming services, where a document may be a particular audio or video channel or a page comprising a portion thereof; review providers, where a document may be a review or discussion that may be arbitrary or connected to a specific product category or product of that provider; virtual social networks, where a document may be a specific public or private user page, fan page, or the like; or news providers, where a document may be a specific news outlet, channel, or news item on that news outlet, or a page representing a portion thereof.

The amount of sample documents received in response to the submission of the initial search request may be preset by the content provider or may be specified by the user. In an example, the content provider has a rule that limits the set of sample documents to 1000 hits if the total number of search results (e.g., 25 billion) for the initial search request exceeds 1000 documents. Generally, the algorithm incorporating the method may be configured to enhance the set of sample documents by submitting the initial search request to multiple content providers and thus receiving multiple portions of sample documents that are added to a total set of sample documents.

The computing device applies a topic model to the set of sample documents to obtain a topic representation. A topic representation is understood herein as a data structure where keywords sourced from the sample documents are organized in a manner (e.g., topologically, sequentially, tabularly, etc.) that highlights similarities and/or differences between the keywords. Such keywords may be obtained by a statistical analysis comprised by the topic model, and hence the topic representation may also contain weights assigned to the keywords such that each keyword may be used (e.g., processed or displayed) according to its assigned weight. A group of keywords represented as similar may be understood as a topic described or covered by the sample documents, and keywords (including identical keywords) represented within a different context may be understood as belonging to different topics. A non-exhaustive example of topic representations includes a topic map, a tag cloud or word cloud, a tree structure, a list and/or a table of topics, keywords, or the like.

The topic representation is presented to the user, e.g., using an output device of the computing device. In response to the presentation, the user enters a topic relevance score for one or more of the topics contained in the topic representation. A score, as used herein, may be a continuous measure, such as a number or an alphanumeric value, and/or a level or category contained in a group of discrete levels or categories.

The computing device implementing the method classifies the data sources according to the topic relevance score obtained from the user. As a result, one or more of the data sources are assigned a source relevance score that is deduced from the topic relevance score value(s) entered by the user. It has to be noted that there is no general limitation to the methodologies that may be used to deduce the source relevance score(s) from the topic relevance score(s), and that the examples described herein are given for the sole purpose of illustration that may turn out useful in certain application scenarios, while those skilled in the art may know or conceive various other rules of deduction that may prove more useful or suitable for other applications.

The topic relevance score and the source relevance score may be different measures that must be mapped appropriately. It appears preferable to use identical measures or categories for the topics and the data sources so such mapping may be unnecessary. However, it may be necessary to define a mapping even for identical relevance measures if topic relevance scores shall correspond to source relevance scores with a non-1:1 weighting. In the general case, it may be possible to define a mapping that, for example, assigns a predefined number of topic relevance levels to a greater number of source relevance levels; that maps a given interval of a numeric topic relevance score to a shifted, larger and/or smaller numeric interval of the source relevance score; that converts a category-based topic relevance score to a numeric source relevance score; or that converts a numeric topic relevance score to a category-based source relevance score. The topic relevance score and the source relevance score may be designed according to an understanding that relevance can be represented by a one-dimensional measure that allows for relative graduations of relevance (e.g., "document A/source B is more/less relevant than document X/source Y"), and preferably also for absolute statements of relevance (e.g., "the most/least relevant document/data source", "the five most/least relevant documents/data sources", "the most/least relevant ten percent of sample documents/data sources", and the like).

Based on the source relevance score, the computing device implementing the method determines a refined search request with an increased selectivity on documents covering a highest-scoring one of the topics. The refined search request may be suggested to the user without starting a new search using the refined search request. The algorithm implementing the method may determine more than one refined search requests that may likewise be presented to the user for selecting a most suitable suggestion.

Due to the one-dimensional nature of the relevance score (s) described above, one or more of the data sources may be identified, e.g., using a predefined threshold criterion, as having a highest score, which may be understood as a higher score relative to further ones of the data sources and/or relative to a predefined threshold value for discrimination high-relevance sources from low-relevance sources. The increase of selectivity may be measured by submitting the refined search request to the content provider, receiving a second set of sample documents in response thereto, counting the number of sample documents from the second set that cover one or more of the previously identified highest-scoring topics, and comparing that number to the corresponding number of sample documents from the first set that cover one or more of the highest-scoring topics, wherein the number determined from the second set should be larger than that determined from the first set.

Without limitation, the increase of selectivity may be achieved by adding one or more additional criteria to the initial search request that can be reasonably expected to limit the topics covered by sample documents of the prospective second set to the previously identified highest-scoring topics, and/or to limit the data sources included in the prospective second search to highest-scoring data sources in terms of the source relevance score(s) previously determined. Without limitation, this may mean to include one or more keywords of the highest-scoring topics and/or one or more data sources of the highest-scoring sources as limiting or focusing criteria into the refined search request, and/or to include one or more keywords of correspondingly defined lowest-scoring topics and/or one or more data sources of correspondingly defined lowest-scoring sources as exclusion criteria into the refined search request.

The refined search request may contain keywords and/or data sources to be included in or excluded from a prospective search based on the refined search request. Such keywords or data sources may be explicitly selected by the user from the presentation of topics (which may require to include the source identifiers in the presentation), or may be derived automatically from the topic relevance score(s) and/or source relevance score(s) assigned by the user, e.g., by including the most frequent keyword(s) from each topic marked as relevant or highly relevant by the user; by excluding the most frequent keyword(s) from each topic marked as irrelevant or lowly relevant by the user; by including data source(s) marked relevant or highly relevant by the user; and/or by excluding data source(s) marked irrelevant or lowly relevant by the user.

After the determination of the refined search request, the user or the algorithm incorporating the method may restart the method by using the refined search request of the completed iteration of the method as the initial search request of the next iteration.

The method may additionally include, before the submission of any search request described herein, querying the content provider for a total number of hits that would be found if the search request was submitted. In response thereto, the search request may be modified before submission by limiting the count of documents to be retrieved to a number lower than the total number of hits.

It may also be of advantage to define a rule for excluding data sources from the application of the topic model, the presentation of the topic representation, the classification and/or the determination of the refined search request, if the number of sample documents retrieved from that data source is less than a predefined smallest number of documents. This may ensure that the classification of data sources as having a high or low relevance is statistically meaningful. For example, if only one sample document is received from a particular data source, its topic relevance may be maximal, such that that data source may be classified with a high source relevance score (the fraction of relevant documents in the sample is 100%), while other documents from the same data source that would match the initial search request but are not included in the set of sample documents may have a non-maximal topic relevance score, such that the classification, if it was based on the high-relevance sample document and the further, less relevant documents as well, might have assigned to the same data source a source relevance score representing lower relevance. In this example, a false high-relevance classification may have been avoided by defining a minimum number of documents per source (for example, three documents) that must be included in the set of sample documents to consider the data source as significant enough to obtain a reliable classification. Likewise, it may be undesirable to exclude data sources because of a false low-relevance classification.

Embodiments of the method may have the advantage that the refined search request, as obtained during a single iteration of the method, is highly selective on documents covering topics to which the user would assign a high relevance if a second topic representation was determined based on a second set of sample documents that would be retrieved from the content provider in response to submitting the refined search request for another search. In comparison, constructing the refined search request manually may require multiple iterations of trial and error until the user can identify a suitable combination (i.e., a combination yielding search results of desired relevance) of keywords and/or data sources to be included in and/or excluded from the search. Hence, embodiments of the present invention may reduce the number of search iterations that are needed to obtain search results of the desired relevance. This may reduce the content provider's workload for searching, accumulating and delivering hits (sample documents and/or larger packages of documents) to requesting users; may improve the requesting user's work efficiency; and may reduce the user's skill level needed to construct a complex search request that yields documents of the desired relevance, excludes irrelevant search results, but does not accidentally exclude relevant search results.

According to an embodiment, the refined search request comprises a logical conjunction of the initial search request and a source criterion, the source criterion reducing the number of data sources covered by the refined search request compared to the number of data sources covered by the initial search request. In other words, the initial search request is expanded by an "AND" relation connecting the initial search request with a statement, i.e., the source criterion, that yields a selection of data sources that were reached by the initial search request in favor of other data sources that, despite having been reached by the initial search request too, become deselected for a future search based on the refined search request. This may allow for focusing such future search on data sources of higher relevance, excluding data sources of lower relevance. A second set of sample documents that may be received during such future search may thus contain a larger portion of sample documents that have a higher probability of covering a highly relevant topic than sample documents from the first set of sample documents (that was obtained in response to the initial search request) than sample documents received from those sources that are excluded in the refined search request.

According to an embodiment, the source criterion comprises either a focus statement selecting one or more of the data sources based on the source relevance score or an exclude statement deselecting one or more of the data sources based on the source relevance score. The focus statement may allow for explicitly including documents from data sources having a high source relevance score, while the exclude statement may allow for explicitly excluding documents from data sources having a low source relevance score. Compared to source criteria that reduce the number of covered data sources implicitly or indirectly, this may form a comparably simple way of reducing the number of covered data sources appropriately and may allow for a targeted specification of data sources to be excluded or included, such that no lowly relevant sources may accidentally be covered by an indirect source criterion.

According to an embodiment, the classification comprises selecting the source relevance score from a predefined set of discrete source relevance levels, the method further comprising, for each source relevance level used for determining the source criterion, determining a total number of hits found for the initial search request at each data source having the respective source relevance level; and identifying, from the data sources having the respective source relevance level, the N data sources having the largest total numbers of hits, N being a predefined upper limit, the determination of the refined search request comprising, for each source relevance level used for determining the source criterion, populating the source criterion with the N identified data sources.

The upper limit N may allow for taking into account that many content providers have limitations on the query length, i.e., they only allow up to a maximum number of statements that may be included in a single search query. By choosing N appropriately, the refined search query may be designed to ensure that a sufficient number of limitations may be posed on the covered or excluded data sources, and at the same time, ensure that a sufficient overhead is kept free from data source specifications to reserve space for statements defining keywords to be included or excluded. For instance, if the search provider allows a maximum number of 40 statements per query, one may choose N=30 such that up to 30 data sources may be explicitly included or excluded from the refined search request, while ten statements are still reserved for keywords.

According to an embodiment, the classification comprises selecting the source relevance score from a predefined set of discrete source relevance levels, the determination of the refined search request comprising selecting one or more of the source relevance levels for performing the increase in selectivity; and/or the topic relevance score being selected from a predefined set of discrete topic relevance levels.

This may result in a discretization of the source relevance score and/or the topic relevance score. A discretization of the topic relevance score may simplify the user's decision about the assignment of a particular relevance score to a topic, as it may be the case if the user would have to assign a numeric score that may appear more abstract to the user than deciding between a number of discrete options. On the other hand, a discretized source relevance score may be beneficial by avoiding the need to predefine threshold values for deciding when a data source has a high relevance, or respectively, a low relevance. Such threshold values may ignore variations in the statistical distribution of numeric relevance between search requests that yield a high fraction of relevant sample documents and other search requests that yield a low fraction thereof. In a non-exhaustive example, the set of topic relevance levels comprises a high-relevance level that allows the user to identify topics that should be kept included in subsequent search queries, and a low-relevance level that allows the user to identify topics that should be excluded from subsequent search queries.

According to an embodiment, the source relevance score and the topic relevance score are selected from a predefined set of discrete common relevance levels, the determination of the refined search request comprising selecting one or more of the common relevance levels for performing the increase in selectivity. This may simplify the mapping of topic relevance levels to source relevance levels because it may be unnecessary to make assumptions on the numerical or qualitative correspondence between topic relevance levels and differently defined source relevance levels.

According to an embodiment, the set of common relevance levels comprises a high-relevance level, the classification comprising assigning a given data source to the high-relevance level if a relative frequency of the sample documents associated with the given data source and covering a topic assigned to the high-relevance level equals or exceeds a predefined high-relevance threshold value, the determination of the refined search request comprising, in case that the high-relevance level is used for the determination of the refined search request, limiting the refined search request, as compared to the initial search request, to one or more of the data sources assigned to the high-relevance level. According to an embodiment, the high-relevance threshold value is one hundred percent.

The high-relevance level may be regarded as representing documents and data sources, respectively, of highest relevance compared to any other relevance levels in the set of common relevance levels. In particular, but not necessarily, the high-relevance threshold may be set to 100%, in which case data sources providing solely documents covering (highly) relevant topics may be classified into the high-relevance level. Otherwise, also such data sources may be included under the high-relevance level that provide not more than a predefined fraction of documents covering less relevant topics. Such relaxation of high-relevance filtering may increase the total number of documents considered as high-relevance documents, which may yield a greater variety of subject matters and/or document types obtained for subsequent analysis.

According to an embodiment, the set of common relevance levels further comprises a low-relevance level, the classification comprising assigning a given data source to the low-relevance level if a relative frequency of the sample documents associated with the given data source and covering a topic assigned to the low-relevance level equals or exceeds a predefined first low-relevance threshold value and/or level if a relative frequency of the sample documents associated with the given data source and covering a topic assigned to the high-relevance level equals or is less than a predefined second low-relevance threshold value, the determination of the refined search request comprising, in case that the low-relevance level is used for the determination of the refined search request, excluding from the refined search request, as compared to the initial search request, one or more of the data sources assigned to the low-relevance level. According to an embodiment, the first low-relevance threshold value is one hundred percent and/or the second low-relevance threshold value is zero percent.

The low-relevance level may be regarded as representing documents and data sources, respectively, of lowest relevance compared to any other relevance levels in the set of common relevance levels. In particular, but not necessarily, the first low-relevance threshold may be set to 100%, in which case data sources providing solely documents covering lowly relevant topics may be classified into the low-relevance level. Additionally or alternatively, and still not necessarily, the second low-relevance threshold may be set to 0%, in which case data sources providing no documents covering highly relevant topics may be classified into the low-relevance level. Otherwise, when relaxing these conditions to a value below 100% for the first low-relevance threshold, or respectively, to a value above 0% for the second low-relevance threshold, also such data sources may be included under the low-relevance level that provide not more than a predefined fraction of documents covering topics of higher relevance, and/or such data sources that provide not more than a predefined fraction of documents covering topics of higher relevance. Such relaxation of low-relevance filtering may increase the total number of documents considered as low-relevance documents, which may yield a more comprehensive exclusion of data sources with a low return of highly relevant documents.

The set of common relevance levels may comprise further relevance levels such as a mid-relevance or partial-relevance level that may be assigned to topics and/or data sources that cannot be assigned to either of the high- and the low-relevance level.

According to an embodiment, the method further comprises obtaining an accuracy level, the refined search request further being determined based on the accuracy level, the accuracy level being obtained from a predefined set of discrete accuracy levels, the increase of selectivity being based on the accuracy level. The accuracy level may reflect the need to create search queries that balance precision (ensuring no computing resources and money are spent on fetching irrelevant content) and recall (ensuring all relevant content is fetched). Incorporating an accuracy level may allow to link the decision on which source relevance level to use for the determination of the refined search request to a user preference and/or statistical properties of the set of sample documents, and may thus simplify the determination of the refined search request. Without limitation, the accuracy level may be received as an input by the user (e.g., using a software-implemented slider or field of radio buttons), or may be determined by the computing device performing the method by analyzing the received set of sample documents.

According to an embodiment, the accuracy level is obtained as an input from the user. This may give the user an additional degree of freedom to influence the result of the method in accordance with accuracy requirements of the individual case that may be specific to the user's higher-level task involving the search request refinement and that may contravene any statistical findings such as keyword frequencies that the computing device implementing the method may find in the received set of sample documents.

According to an embodiment, the set of accuracy levels comprises a high-precision level, a balanced-accuracy level, and a high-recall level, the source relevance score being selected from the group consisting of a high-relevance level, a mid-relevance level, and a low-relevance level, the classification comprising assigning a given data source to the high-relevance level if a relative frequency of the sample documents associated with the given data source and covering a topic assigned to the high-relevance level equals or exceeds a predefined high-relevance threshold value, the classification further comprising assigning a given data source to the low-relevance level if a relative frequency of the sample documents associated with the given data source and covering a topic assigned to the low-relevance level equals or exceeds a predefined first low-relevance threshold value and/or level if a relative frequency of the sample documents associated with the given data source and covering a topic assigned to the high-relevance level equals or less than a predefined second low-relevance threshold value, the classification further comprising assigning a given data source to the mid-relevance level if it cannot be assigned to either of the high-relevance level and the low-relevance level. In case that the obtained accuracy level is the high-precision level, the refined search request comprises a logical conjunction of the initial search request and a focus statement selecting one or more of the data sources having the high-relevance level as the source relevance score. In case that the obtained accuracy level is the balanced-accuracy level, the refined search request comprises a logical conjunction of the initial search request and a focus statement comprising a logical disjunction of one or more of the data sources having the high-relevance level as the source relevance score and of one or more of the data sources having the mid-relevance level as the source relevance score. In case that the obtained accuracy level is the high-recall level, the refined search request comprises a logical conjunction of the initial search request and a focus statement comprising a logical negation of one or more of the data sources having the low-relevance level as the source relevance score.

This may constitute an advantageous correspondence between the set of accuracy levels and the source relevance score that may simplify the choice which source-relevance level to use for the determination of the refined search request. Let K be the initial search request, $S_R$ be the set of relevant data sources, i.e., the set of data sources classified with the high-relevance level, $S_P$ be the set of partially relevant data sources, i.e., the set of data sources classified with the mid-relevance level, and SI be the set of irrelevant data sources, i.e., the set of data sources classified with the low-relevance level. Then, the three cases described above for determining the refined search request may be written shortly as "K AND $S_R$" for the high-precision level, i.e., determining the refined search request by limiting the initial search request to the highly relevant data sources; "K AND ($S_R$ OR $S_P$)" for the balanced-accuracy level, i.e., determining the refined search request by limiting the initial search request to the highly relevant data sources and the partially relevant data sources as well; and "K AND (NOT $S_I$)" for the high-recall level, i.e., determining the refined search request by excluding the irrelevant data sources from the initial search request.

It may be seen that the refined search request that is determined for the high-precision level may yield the strictest focus on highly relevant documents, while the balanced-accuracy level may include further highly relevant documents at the cost of including an additional portion of documents that may be outside of the high-relevance level, i.e., that may cover a topic of lover relevance. It may be noted further that both the high-precision accuracy level and the balanced-accuracy level correspond to a strategy of focusing refinement, i.e., the spectrum of data sources is explicitly limited to sources with a high probability of delivering highly relevant documents, while the high-recall level corresponds to a strategy of excluding refinement, i.e., only the least relevant data sources are explicitly excluded, such that a greater variety of topics of high and intermediate relevance may be expected for the high-recall case. Thus, the high-recall level may be recommendable if it can be expected that the number of highly relevant search results is small compared to the number of irrelevant documents, such that an exclusion of the lowly relevant data sources may maximize the number of relevant search results. On the other hand, the high-precision level may be recommendable if the number of relevant search results is large compared to the number of irrelevant documents, and/or if the initial search request is highly ambiguous so that a high selectivity may be desirable to filter out all topics or keywords of minor relevance. In addition, the balanced-accuracy level may be advantageous as a choice that is suggested to the user as a standard setting, which may be helpful if neither the high-precision level nor the high-recall level appears clearly advantageous.

According to an embodiment, the topic relevance score is selected from a topic relevance group comprising a high-relevance level representing the highest relevance compared to all further relevance levels in the topic relevance group, the method further comprising determining a number $D_R$ of the sample documents covering a topic having the high-relevance level as the topic relevance score. The high-precision level is set as the accuracy level if the ratio of $D_R$ to the total number D of sample documents in the set of sample documents, $D_R/D$, is less than or equal to a predefined lower accuracy threshold. The balanced-accuracy level is set as the accuracy level if $D_R/D$ is greater than the lower accuracy threshold and less than a predefined upper accuracy threshold. The high-recall level is set as the accuracy level if $D_R/D$ is greater than or equal to the upper accuracy threshold.

In this way, the accuracy type may be determined automatically by a statistical analysis of the received set of sample documents. It may be noted that only the number $D_R$ of highly relevant sample documents and the total number D of sample documents may be required to obtain a decision on the accuracy level to use for determining the refined search request. Moreover, it may be unnecessary to retrieve further information from the content provider in order to make this decision. In this way, it may be possible to determine the refined search request with a minimum of interaction with the user and the content provider, and with a highly efficient use of the computing resources of the computing device implementing the method.

According to an embodiment, the topic relevance score is selected from a topic relevance group comprising a high-relevance level representing the highest relevance compared to all further relevance levels in the topic relevance group, the method further comprising querying from the content provider a number $D_{RS}$ of documents available as search results for a hypothetic search request comprising a logical conjunction of the initial search request and a focus statement selecting one or more of the data sources having the high-relevance level as the source relevance score, the method further comprising querying from the content provider a number $D_K$ of documents available as search results for the initial search request. The high-precision level is set as the accuracy level if the ratio of $D_{RS}$ to $D_K$, $D_{RS}/D_K$, is less than or equal to the lower accuracy threshold. The balanced-accuracy level is set as the accuracy level if $D_{RS}/D_K$ is greater than the lower accuracy threshold and less than the upper accuracy threshold. The high-recall level is set as the accuracy level if $D_{RS}/D_K$ is greater than or equal to the upper accuracy threshold.

This way of determining the accuracy level governing the determination of the refined search request may be advantageous especially, but not necessarily, if the total number $D_K$ of hits indicated by the content provider for the initial search request K is large compared to the number D of received sample documents. In this situation, the set of sample documents may be too small to carry statistical relevance, so a more accurate decision may be made if the statistics of the totality of hits is considered instead of that of the set of sample documents only. However, it may also be of advantage to make the accuracy level decision based on $D_{RS}$ and $D_K$ with no regard to the proportions of D and $D_K$ if it is desired to deliver the refined search request with a high quality by minimizing the number of assumptions for performing the method.

According to an embodiment, the method further comprises, in response to the presentation, receiving from the user a document relevance score for one or more of the sample documents, the classification of the data sources being further based on the document relevance score; and/or receiving from the user the source relevance score for one or more of the data sources, the data sources having the source relevance score received from the user being exempt from the classification; and/or receiving from the user a keyword relevance score for one or more keywords representing one or more of the topics, the classification of the data sources being further based on the keyword relevance score.

Offering the user the possibility to specify relevance scores for items other than topics may improve the probability of obtaining the refined search request with a high selectivity on highly relevant documents even if the user is unsure about which relevance to assign to certain topics identified by the topic model, or if the identified topics do not appear to offer an appropriate support for the kind of relevance anticipated by the user. For instance, the user may find a specific sample document to be more relevant than all of the presented topics, and may mark this document as highly relevant accordingly. The algorithm implementing the method may then obtain the desired increase in selectivity, e.g., by focusing the refined search request on the data source from which the sample document marked as highly relevant was obtained, and/or focusing the refined search request on characteristic keywords of the sample document. Similarly, the refined search request may be configured to exclude keywords and/or sources pertaining to irrelevant documents; to include data sources that the user specifies to be highly relevant and/or exclude data sources that the user specifies to be irrelevant; and/or to include keywords that the user specifies to be highly relevant and/or exclude keywords that the user specifies to be irrelevant.

According to an embodiment, the method further comprises applying a predefined default topic relevance score to topics having not received the topic relevance score; and/or applying a predefined default source relevance score to data sources for which the source relevance score was not determined during the classification. This may maximize the number of topics and/or data sources that are accessible as a basis for the determination of the refined search request.

According to an embodiment, the presentation is limited to topics equaling or exceeding a predefined minimum number of hits for the initial search request. This may prevent the user from marking topics as relevant or irrelevant that have a low statistical significance because the number of hits for keywords within these topics is too small. Likewise, the presentation of statistically insignificant data sources, keywords and/or sample documents may be suppressed to prevent the user from accidentally marking such data sources, keywords and/or sample documents as relevant or irrelevant.

Now turning to the drawings, FIG. 1 depicts an exemplary routine for processing an initial search request K using an exemplary computing environment adapted for retrieving sample documents in response to the initial search request K. A user 101 uses a computing device 10 that is connected to another computing device (e.g., a server) of a document provider 130 via a computing network 120. The user enters the initial search request K into the computing device 10 and submits the initial search request via the network 120 to the content provider 130. Without limitation, the initial search request K may include keywords to be included or excluded in the requested search and/or source identifiers (e.g., URLs) of data sources to be included or excluded in the requested search. The initial search request K may further comprise an identifier that indicates to the content provider 130 that the requested search shall be limited to a set of sample documents, where specifications of the set of sample documents to be returned, such as the maximum number of hits to be included in the set of sample documents, may be predetermined by the content provider 130 and/or by an according specification also contained in the initial search request K.

In response, the content provider 130 parses the initial search request K and performs, if the initial search request K is valid, a search for documents matching the initial search request K. According to the given specifications for the set of sample documents to be returned, the document provider 130 aggregates a set 132 of sample documents and delivers the set 132 via the network 120 to the computing device 10 of the user 101.

FIG. 2 depicts an exemplary topic representation 200 that is formed, in the non-limiting particular case shown in FIG. 2, by a list of topics 202, 204, 206, 208, and 210, where each topic is represented by a list of keywords that are printed in style of a tag cloud, i.e., with different font sizes corresponding to a relative frequency of the respective keyword within documents covering the respective topic. The example shown in FIG. 2 may be used to assign topic relevance scores to one or more of the topics 202, 204, 206, 208, and 210, and optionally also keyword relevance scores to one or more of the keywords shown. The particular choice of a list of tag-cloud topics as the topic representation 200 is purely illustrative; without limitation, other choices for the topic representation 200 may make use of a topic map, a tag cloud, a tree structure, a list, a table, or a combination thereof.

Figure 3:
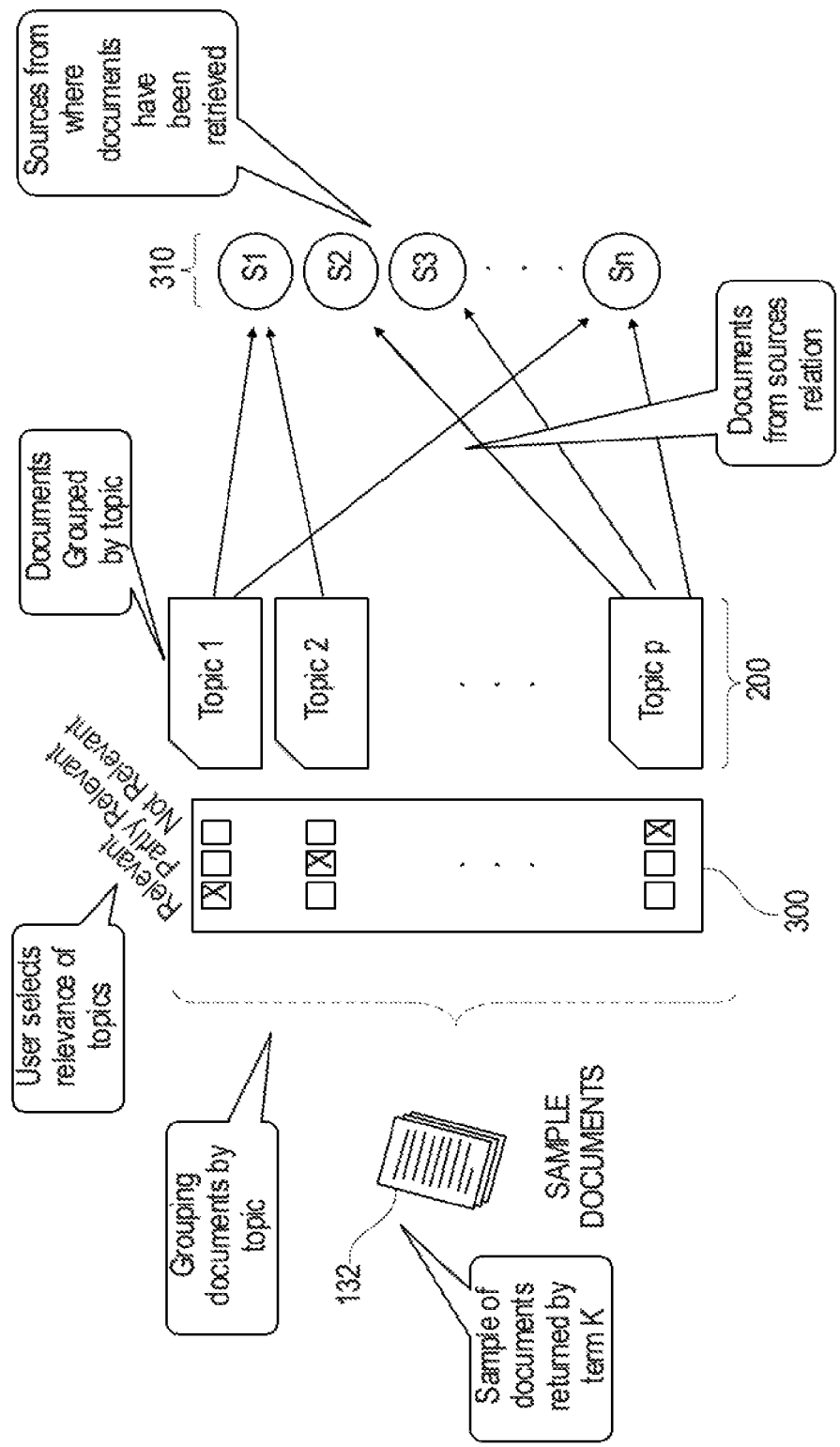
FIG. 3 is a diagram illustrating handling of relevance scores, in accordance with one embodiment of the present invention.

FIG. 3 is a diagram illustrating relationships that may facilitate the handling of relevance scores, in accordance with one embodiment of the present invention. By application of the topic model, which is assumed to be known and is therefore not described herein, the received set 132 of sample documents is analyzed and the single sample documents are assigned to topics. The topics are presented to the user 101 as a topic representation 200 that includes an interface 300, allowing the user 101 to set a topic relevance score for one or more of the topics. In the non-exhaustive example shown in FIG. 3, each topic can be assigned one topic relevance level out of the group containing the topic relevance levels "Relevant", "Partially Relevant", and "Not Relevant". In the specific example of FIG. 3, Topic 1 is assigned the topic relevance level "Relevant", which may also be referred to as a high-relevance level; Topic 2 is assigned the topic relevance level "Partially Relevant", which may also be referred to as a mid-relevance level; and Topic p is assigned the topic relevance level "Not Relevant", which may also be referred to as a low-relevance level.

The diagram of FIG. 3 is simplified by showing only four data sources 310 from which six sample documents out of the set 132 originate. Topic 1 is populated by one document from source S1 and one document from source Sn; Topic 2 is populated by one document from source S1; and Topic p is populated by one document from source S2, one document from source S3, and one document from source Sn. Hence, source S1 yielded one sample document of high relevance and one document of partial relevance; sources S2 and S3 each yielded one sample document of low relevance; and source Sn yielded one sample document of high relevance and one document of low relevance. In the simplified example shown, one exemplary and purely illustrative way of classifying the data sources 310 into source relevance scores may be to assign weights to the topic relevance scores, e.g., 100% for each document having high relevance, 50% for each document having partial relevance, and 0% for each document having low relevance. In the same example, averaging per data source may yield a weight of 75% for source S1; 0% for sources S2 and S3; and 50% for source Sn. Still in the non-limiting example, threshold values of 33% average weight may be applied for deciding between a low source relevance level and an intermediate source relevance level, and 67% average weight for deciding between a high source relevance level and the intermediate source relevance level. In the same example, this may result in a classification of S1 as a high-relevance data source; S2 and S3 as low-relevance data sources; and Sn as a mid-relevance data source. It must be noted that the present invention anticipates no restriction for applying any modified or different approach for deriving the source relevance scores from the topic relevance scores.

Figure 4:
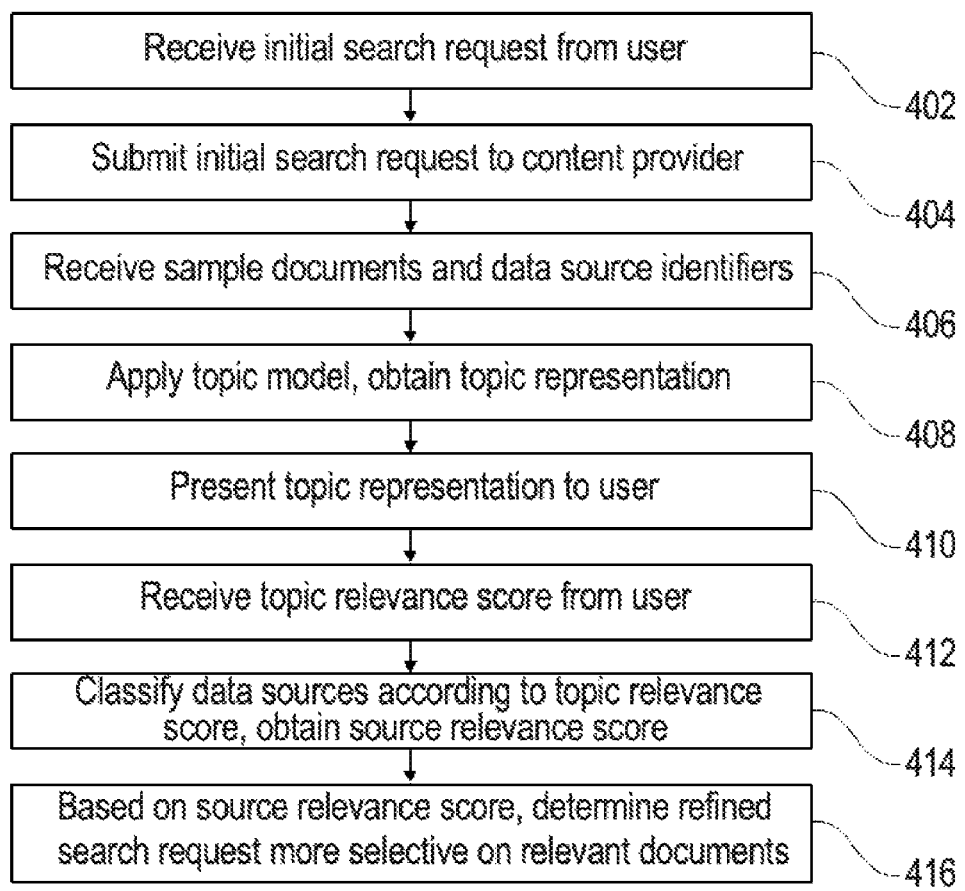
FIG. 4 is a flow diagram illustrating steps of a method for refining an initial search request to a content provider, in accordance with one embodiment of the present invention.

FIG. 4 is a flow diagram illustrating steps of an exemplary method for refining an initial search request to a content provider, in accordance with one embodiment of the present invention. Steps of this method are described in the following from the point of view of a computing device 10 incorporating an algorithm implementing the method. The method comprises a step 402 where an initial search request is received from a user 101. Subsequently, the initial search request is submitted at step 404, e.g., using a computing or communications network 120, to a content provider 130.

Then, a set 132 of sample documents matching the initial search request is received at step 406 from the content provider 130. Each sample document is assigned a data source identifier representing a data source 310 from which the respective sample document is sourced.

A topic model is applied at step 408 to the set 132 of received sample documents. The topic model may identify mutually exclusive topics and may assign each of the sample documents to one of the identified topics. Step 408 also comprises obtaining a topic representation 200 of the topics that can be output to the user. The topic representation is then presented at step 410 to the user, e.g., using an output device of the computing device 10. In response to the presentation at step 410, a topic relevance score is received at step 412 from the user for one or more of the presented topics.

Next, the data sources 310 are classified at step 414 according to the topic relevance score. As a result, one or more of the data sources 310 is assigned a source relevance score that is derived from the received topic relevance score(s) by applying a suitable logic. Subsequently, a further logic is applied to determine at step 416 a refined search request based on the obtained source relevance score(s). The refined search request may be based on the initial search request or may be newly constructed based on the keywords, topic relevance scores and/or source relevance scores obtained during the steps 408, 412 and 414. Compared to the initial search request, the refined search request is constructed in a manner that it has an increased selectivity on sample documents that have been assigned to one or more of the topics that received a highest topic relevance score during the user's assignment at step 412, and/or on further documents that match the initial search request and would be assigned to one or more of these highest-scoring topics if such further documents were included in the set 132 of sample documents.

Figure 5:
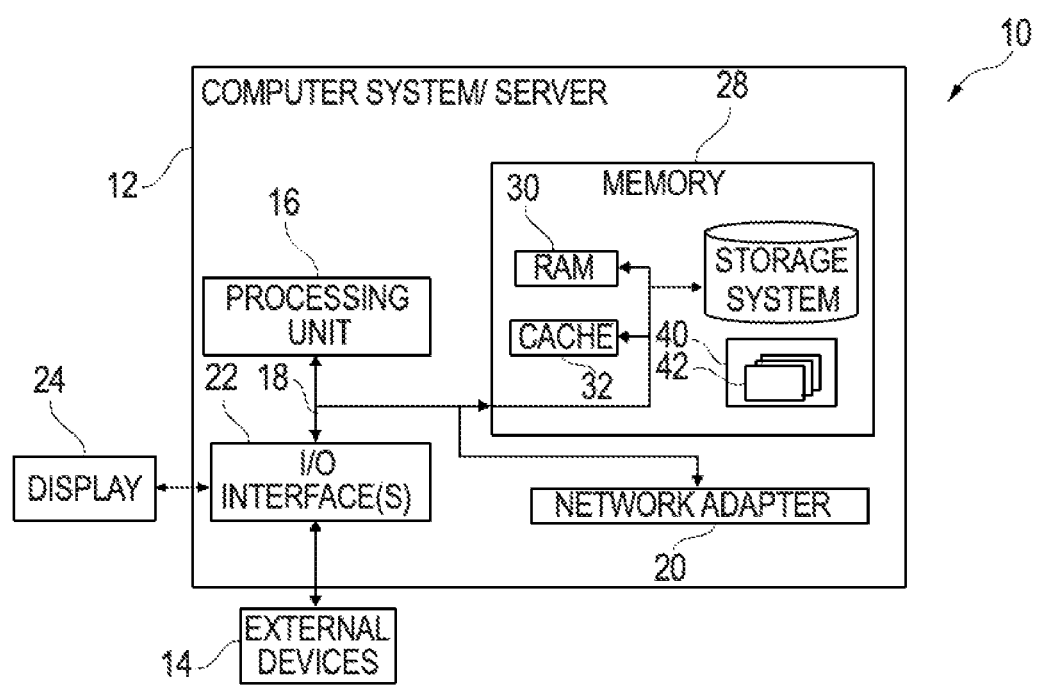
FIG. 5 depicts components of an exemplary computing device, in accordance with one embodiment of the present invention.

Embodiments of the present invention may be implemented using a computing device that may also be referred to as a computer system, a client, or a server. Referring now to FIG. 5, a schematic of an example of a computer system is shown. Computer system 10 is only one example of a suitable computer system and is not intended to suggest any limitation as to the scope of use or functionality of embodiments of the invention described herein. Regardless, computer system 10 is capable of being implemented and/or performing any of the functionality set forth hereinabove.

In computer system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 5, computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include but are not limited to: microcode, device drivers, redundant processing units, external disk drive arrays, RAID systems, tape drives, and data archival storage systems, etc.

A computer system such as the computer system 10 shown in FIG. 5 may be used for performing operations disclosed herein such as refining an initial search request to a content provider. Such computer system may be a stand-alone computer with no network connectivity that may receive data to be processed, such as the initial search request, the set of sample documents with corresponding source identifiers, or the topic relevance score, through a local interface. Such operation may, however, likewise be performed using a computer system that is connected to a network such as a communications network and/or a computing network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

What is claimed is:

1. A computer-implemented method for refining an initial search request to a content provider, the method comprising:
    receiving the initial search request from a user;
    submitting the initial search request to the content provider;
    receiving, from the content provider, a set of sample documents and source identifiers for respective ones of the sample documents, the source identifiers identifying respective ones of data sources associated with the respective ones of the sample documents;
    applying a topic model to the set of the sample documents, to obtain a topic representation, the topic representation being descriptive of topics covered by the respective ones of the sample documents;
    presenting the topic representation to the user;
    receiving, from the user, topic relevance scores for respective ones of the topics;
    classifying the data sources according to the topic relevance scores, to obtain source relevance scores for respective ones of the data sources; and
    based on the source relevance scores, determining a refined search request, the refined search request having an increased selectivity on documents covering a highest-scoring one of the topics.

2. The computer-implemented method of claim 1, wherein the refined search request comprises a logical conjunction of the initial search request and a source criterion, wherein the source criterion reduces a number of data sources covered by the refined search request compared to a number of data sources covered by the initial search request.

3. The computer-implemented method of claim 2, wherein the source criterion comprises either a focus statement selecting one or more of the data sources based on the source relevance scores or an exclude statement deselecting one or more of the data sources based on the source relevance scores.

4. The computer-implemented method of claim 2, wherein the classifying the data sources comprises selecting the source relevance scores from a predefined set of discrete source relevance levels, wherein the computer-implemented method further comprises:
    for a respective one of the discrete source relevance levels used for determining the source criterion, determining a total number of hits found for the initial search request at a respective one of the data sources having the respective one of the discrete source relevance levels; and
    identifying, from the data sources having the respective one of the discrete source relevance levels, N of the data sources having largest total numbers of hits, N being a predefined upper limit, wherein the determining the refined search request comprises, for respective one of the discrete source relevance levels used for determining the source criterion, populating the source criterion with N identified data sources.

5. The computer-implemented method of claim 1, wherein the classifying the data sources comprises selecting the source relevance scores from a predefined set of discrete source relevance levels, wherein the determining the refined search request comprises selecting one or more of the source relevance levels for performing increase in selectivity, wherein the topic relevance scores are selected from a predefined set of discrete topic relevance levels.

6. The computer-implemented method of claim 1, wherein the source relevance scores and the topic relevance scores are selected from a predefined set of discrete common relevance levels, wherein the determining the refined search request comprises selecting one or more of the discrete common relevance levels for performing increase in selectivity.

7. The computer-implemented method of claim 6, wherein the predefined set of the discrete common relevance levels comprises a high-relevance level, wherein the classifying the data sources comprises assigning a given data source to the high-relevance level if a relative frequency of the sample documents associated with the given data source and covering a topic assigned to the high-relevance level equals or exceeds a predefined high-relevance threshold value, wherein the determining the refined search request comprises, in case that the high-relevance level is used for the determining the refined search request, limiting the refined search request, as compared to the initial search request, to one or more of the data sources assigned to the high-relevance level.

8. The computer-implemented method of claim 7, wherein the predefined high-relevance threshold value is one hundred percent.

9. The computer-implemented method of claim 6, wherein the set of the discrete common relevance levels further comprises a low-relevance level, wherein the classifying the data sources comprises assigning a given data source to the low-relevance level if a relative frequency of the sample documents associated with the given data source and covering a topic assigned to the low-relevance level equals or exceeds a predefined first low-relevance threshold value, and/or covering a topic assigned to the high-relevance level equals or is less than a predefined second low-relevance threshold value, wherein the determining the refined search request comprises, in case that the low-relevance level is used for the determining the refined search request, excluding from the refined search request, as compared to the initial search request, one or more of the data sources assigned to the low-relevance level.

10. The computer-implemented method of claim 9, wherein the first low-relevance threshold value is one hundred percent and the second low-relevance threshold value is zero percent.

11. The computer-implemented method of claim 1, further comprising:

obtaining an accuracy level, wherein the refined search request is further determined based on the accuracy level, wherein the accuracy level is obtained from a predefined set of discrete accuracy levels, wherein increase of selectivity is based on the accuracy level.

12. The computer-implemented method of claim 11, wherein the accuracy level is obtained as an input from the user.

13. The computer-implemented method of claim 11, wherein a set of the accuracy levels comprises a high-precision level, a balanced-accuracy level, and a high-recall level, wherein a respective one of the source relevance scores are selected from a group consisting of a high-relevance level, a mid-relevance level, and a low-relevance level, wherein the classifying the data sources comprises assigning a given data source to the high-relevance level if a relative frequency of the sample documents associated with the given data source and covering a topic assigned to the high-relevance level equals or exceeds a predefined high-relevance threshold value, wherein the classifying the data sources further comprises assigning a given data source to the low-relevance level if a relative frequency of the sample documents associated with the given data source and covering a topic assigned to the low-relevance level equals or exceeds a predefined first low-relevance threshold value, and/or covering a topic assigned to the high-relevance level equals or is less than a predefined second low-relevance threshold value, wherein the classifying the data sources further comprises assigning a given data source to the mid-relevance level if it cannot be assigned to either of the high-relevance level and the low-relevance level, wherein, in case that the accuracy level is the high-precision level, the refined search request comprises a logical conjunction of the initial search request and a focus statement selecting one or more of the data sources having the high-relevance level as the source relevance score, wherein, in case that the accuracy level is the balanced-accuracy level, the refined search request comprises a logical conjunction of the initial search request and a focus statement comprising a logical disjunction of one or more of the data sources having the high-relevance level as the source relevance score and of one or more of the data sources having the mid-relevance level as the source relevance score, wherein, in case that the accuracy level is the high-recall level, the refined search request comprises a logical conjunction of the initial search request and a focus statement comprising a logical negation of one or more of the data sources having the low-relevance level as the source relevance score.

14. The computer-implemented method of claim 13, wherein a respective one of the topic relevance scores is selected from a topic relevance group comprising a high-relevance level representing highest relevance compared to all further relevance levels in the topic relevance group, wherein the computer-implemented method further comprises:
determining a number $D_R$ of the sample documents covering a topic having the high-relevance level as the topic relevance score, wherein the high-precision level is set as the accuracy level if a ratio of $D_R$ to a total number D of the sample documents in the set of sample documents, $D_R/D$, is less than or equal to a predefined lower accuracy threshold; wherein the balanced-accuracy level is set as the accuracy level if $D_R/D$ is greater than the predefined lower accuracy threshold and less than a predefined upper accuracy threshold, and wherein the high-recall level is set as the accuracy level if $D_R/D$ is greater than or equal to the predefined upper accuracy threshold.

15. The computer-implemented method of claim 13, wherein a respective one of the topic relevance scores is selected from a topic relevance group comprising a high-relevance level representing highest relevance compared to all further relevance levels in the topic relevance group, wherein the method further comprising:
querying from the content provider a number $D_R S$ of documents available as search results for a hypothetic search request comprising a logical conjunction of the initial search request and a focus statement selecting one or more of the data sources having the high-relevance level as the source relevance score; and
querying from the content provider a number $D_K$ of documents available as search results for the initial search request, wherein the high-precision level is set as the accuracy level if a ratio of $D_{RS}$ to $D_K$, $D_{RS}/D_K$, is less than or equal to a predefined lower accuracy threshold, wherein the balanced-accuracy level is set as the accuracy level if $D_{RS}/D_K$ is greater than the predefined lower accuracy threshold and less than a predefined upper accuracy threshold, wherein the high-recall level is set as the accuracy level if $D_{RS}/D_K$ is greater than or equal to the predefined upper accuracy threshold.

16. The computer-implemented method of claim 1, further comprising:
receiving, from the user, document relevance scores for respective ones of the sample documents, the classifying the data sources being further based on the document relevance scores;
receiving from the user the source relevance scores for the respective ones of the data sources, the data sources having the source relevance scores received from the user being exempt from the classifying the data sources; and
receiving, from the user, keyword relevance scores for respective ones of keywords representing the respective ones of the topics, the classifying the data sources being further based on the keyword relevance scores.

17. The computer-implemented method of claim 1, further comprising:
applying a predefined default topic relevance score to topics that have not received the topic relevance scores; and
applying a predefined default source relevance score to the data sources for which the source relevance scores have not determined during the classifying the data sources.

18. The computer-implemented method of claim 1, wherein the topic representation is limited to topics equaling or exceeding a predefined minimum number of hits for the initial search request.

19. A computer program product for refining an initial search request to a content provider, the computer program product comprising a computer readable storage medium having program instructions embodied therewith, the program instructions executable by one or more processors, the program instructions executable to:
receive the initial search request from a user;
submit the initial search request to the content provider;
receive, from the content provider, a set of sample documents and source identifiers for respective ones of the sample documents, the source identifiers identifying respective ones of data sources associated with the respective ones of the sample documents;

apply a topic model to the set of the sample documents, to obtain a topic representation, the topic representation being descriptive of topics covered by the respective ones of the sample documents;

present the topic representation to the user;

receive, from the user, topic relevance scores for respective ones of the topics;

classify the data sources according to the topic relevance scores, to obtain source relevance scores for respective ones of the data sources; and based on the source relevance scores, determine a refined search request, the refined search request having an increased selectivity on documents covering a highest-scoring one of the topics.

20. A computer system for refining an initial search request to a content provider, the computer system comprising:

one or more processors, one or more computer readable tangible storage devices, and program instructions stored on at least one of the one or more computer readable tangible storage devices for execution by at least one of the one or more processors, the program instructions executable to:

receive the initial search request from a user;

submit the initial search request to the content provider;

receive, from the content provider, a set of sample documents and source identifiers for respective ones of the sample documents, the source identifiers identifying respective ones of data sources associated with the respective ones of the sample documents;

apply a topic model to the set of the sample documents, to obtain a topic representation, the topic representation being descriptive of topics covered by the respective ones of the sample documents;

present the topic representation to the user;

receive, from the user, topic relevance scores for respective ones of the topics;

classify the data sources according to the topic relevance scores, to obtain source relevance scores for respective ones of the data sources; and based on the source relevance scores, determine a refined search request, the refined search request having an increased selectivity on documents covering a highest-scoring one of the topics.

\* \* \* \* \*